US006888108B2

(12) United States Patent
Carr (10) Patent No.: US 6,888,108 B2
(45) Date of Patent: May 3, 2005

(54) LOW VOLTAGE POWER SUPPLY SYSTEM FOR AN ELECTRIC BLANKET OR THE LIKE (75) Inventor: Sheldon P. Carr, West Bend, WI (US)

(73) Assignee: Perfect Fit Industries, Inc., Charlotte, NC (US)

(*) Notice: Subject to any disclaimer, the term of this patent is extended or adjusted under 35 U.S.C. 154(b) by 6 days.

(21) Appl. No.: 10/269,189

(22) Filed: Oct. 11, 2002

(65) Prior Publication Data
US 2004/0070996 A1 Apr. 15, 2004

(51) Int. Cl.[7] .................................. H05B 1/02
(52) U.S. Cl. ...................... 219/483; 219/507; 363/21.01
(58) Field of Search .......................... 363/16, 20, 21.01, 363/21.02, 21.04, 21.07, 21.08–21.018, 56.05, 56.08, 56.11, 40, 44, 56.12; 219/482, 483, 485, 486, 507, 508

(56) References Cited

U.S. PATENT DOCUMENTS

| 4,348,582 A | * | 9/1982 | Budek .......................... 219/483 |
| 5,036,177 A | | 7/1991 | Pagliarini, Jr. |
| 5,484,983 A | | 1/1996 | Roell |
| 5,640,312 A | | 6/1997 | Carroll |
| 5,689,407 A | | 11/1997 | Marinus et al. |
| 5,770,836 A | | 6/1998 | Weiss |
| 5,801,914 A | | 9/1998 | Thrash |
| 5,812,383 A | | 9/1998 | Majid et al. |
| 5,824,996 A | | 10/1998 | Kochman et al. |

(Continued)

FOREIGN PATENT DOCUMENTS

| EP | 0875983 | 11/1998 |
| WO | WO 02/058222 | 7/2002 |

OTHER PUBLICATIONS

PCT International Search Report dated Mar. 19, 2004, PCT/US03/31966, 4 pages.

Primary Examiner—Jessica Han
(74) Attorney, Agent, or Firm—Boyle, Fredrickson, Newholm, Stein & Gratz, S.C.

(57) ABSTRACT

A power supply system for outputting low voltage electrical power from a high voltage power source includes an isolation-type power conversion device, such as a transformer having a primary high voltage side and an isolated secondary low voltage side. The low voltage side is interconnected with a power output arrangement, which is adapted to supply low voltage power to a load, which may be in the form of an electric blanket or the like. A switching arrangement is interconnected with the high voltage primary side of the power conversion device, for providing intermittent operation of the power conversion device. The period of intermittent operation of the power conversion device is controlled via a control arrangement, to vary the power output from the low voltage secondary side of the transformer and thereby to the electrical load. The control arrangement is preferably in the form of a pulse width modulation (PWM) control, which receives inputs from a controller that is powered from the isolated secondary low power output of the power conversion device via isolated primary and secondary circuits, to vary the duty cycle of the switching power conversion device. The power supply includes a burst logic circuit that provides high frequency intermittent operation of the power conversion device through the switching arrangement when the controller is off, to supply low voltage power to the controller which enables initial operation of the controller and thereby operation of the power conversion device. The low voltage output is interconnected with a load detection arrangement which disables the controller in the event the load is disconnected from the low voltage output. An over-voltage switch is also interconnected with the low voltage output, to shutdown the power supply in the event the voltage of power supplied to the low voltage output exceeds a predetermined low voltage threshold.

28 Claims, 9 Drawing Sheets

U.S. PATENT DOCUMENTS

| | | |
|---|---|---|
| 5,861,610 A | 1/1999 | Weiss |
| 6,018,467 A | 1/2000 | Majid et al. |
| 6,057,530 A | 5/2000 | Gurevich |
| 6,078,026 A | 6/2000 | West |
| 6,084,206 A | 7/2000 | Williamson et al. |
| 6,097,009 A | 8/2000 | Cole |
| 6,172,344 B1 | 1/2001 | Gordon et al. |
| 6,177,658 B1 | 1/2001 | White et al. |
| 6,222,162 B1 | 4/2001 | Keane |
| 6,229,123 B1 | 5/2001 | Kochman et al. |
| 6,310,332 B1 | 10/2001 | Gerrard |
| 6,326,596 B1 | 12/2001 | O'Leary et al. |
| 6,369,369 B2 | 4/2002 | Kochman et al. |
| 6,388,237 B1 | 5/2002 | Miyahara et al. |
| 6,392,209 B1 | 5/2002 | Oppitz |
| 6,403,935 B2 | 6/2002 | Kochman et al. |
| 6,414,286 B2 | 7/2002 | Rock et al. |
| 2002/0117495 A1 | 8/2002 | Kochman et al. |
| 2002/0121887 A1 | 9/2002 | Inatomi et al. |
| 2002/0122319 A1 | 9/2002 | Mobers et al. |
| 2002/0122323 A1 | 9/2002 | Nagaya et al. |

* cited by examiner

LOW VOLTAGE POWER SUPPLY SYSTEM FOR AN ELECTRIC BLANKET OR THE LIKE

BACKGROUND AND SUMMARY OF THE INVENTION

This invention relates to an electrical power supply system, and more particularly to a low voltage power supply system for use in an application such as an electric blanket or the like.

An electric blanket, heating pad or throw typically includes internal resistive heating elements that function to emit heat when supplied with electrical power. Typically, the power supplied to the internal resistive heating elements is 120 volt AC electrical power, obtained from a conventional high voltage power source such as a wall outlet. While this type of power supply and heating arrangement functions satisfactorily, there are certain drawbacks associated with the supply of high voltage electrical power to the resistive heating elements incorporated in the blanket, heating pad or throw due to exposure of the user to the heating elements to which the high voltage power is supplied.

It is an object of the present invention to provide a power supply that converts high voltage input power to low voltage output power. It is a further object of the invention to provide such a power supply that is safe and reliable, and is capable of being used in an application such as an electric blanket, heating pad or throw, to avoid the drawbacks associated with use of high voltage electrical power in an application of this type. It is a further object of the invention to provide such a power supply in which the high voltage power input is isolated from the low voltage power output, to prevent the application of high voltage power to the load. Another object of the invention is to provide a power supply which automatically discontinues operation, or which prevents operation at start-up, in the event the load is disconnected from the power supply. Yet another object of the invention is to provide such a power supply which can be manufactured economically yet which is capable of efficiently and effectively providing a safe, reliable and controllable low voltage power output from a high voltage power input. Yet another object of the invention is to provide such a power supply capable of receiving and supplying power to a low voltage controller for regulating the output of the power supply.

In accordance with the present invention, a power supply, such as for use in an application such as an electric blanket, heating pad or throw, includes a power input arrangement adapted to receive power having a voltage exceeding a low voltage threshold. The power supply includes an isolation-type power conversion device, such as a transformer, that includes an input and an isolated output. The input of the power conversion device is interconnected with the power input arrangement, so that high voltage power is supplied to the input of the power conversion device. A switching arrangement is interconnected with the power conversion device for providing intermittent operation of the power conversion device, to provide output power to the isolated power output of the power conversion device. A power output arrangement is interconnected with the isolated output of the power conversation device. The intermittent operation of the power conversion device by the switching arrangement is operable to supply output power to the power output arrangement through the isolated output of the power conversion device, having a voltage below the low voltage threshold.

The power supply generally consists of a primary side, which is adapted to receive high voltage input power, and a secondary side isolated from the primary side via the isolation-type power conversion device, which is operable to output low voltage power. The isolation-type power conversion device may be in the form of a transformer that converts the high voltage input power to low voltage output power. The switching arrangement controls the duty cycle of the transformer, to control the power output of the transformer.

The output of the power supply is variable, according to the power demands of the load to which the power supply is connected. In the case of an electric blanket, heating pad or throw, the power supply includes an adjustable controller having settings that represent the amount of heat desired to be output by the resistive heating element, and the controller is operable to vary the power output of the power supply to control the power output so as to supply the desired heat output of the heating element. The controller is preferably interconnected with the secondary side of the power supply, to supply power to the controller. Outputs from the controller are supplied to an isolated feedback circuit associated with the secondary side of the power supply, and interact with an isolated and associated primary feedback circuit of the primary side of the power supply, e.g. via an IRED LED arrangement incorporated in the feedback circuits of the primary and secondary sides of the power supply. The switching arrangement is in the form of a power switch driven by a power switch driver interconnected with the feedback circuit of the primary side of the power supply. The feedback circuit of the primary side provides control of the power switch to control the low voltage power output of the transformer.

The primary side of the power supply includes a fundamental frequency oscillator which provides an output that is controlled by a network that varies the duty cycle of the fundamental frequency oscillator in response to inputs from the controller through the isolated primary and secondary feedback circuits, to control operation of the power switch and thereby the power output of the transformer. The primary side of the power supply further includes a burst logic circuit that provides an intermittent high frequency output that overrides the output of the fundamental frequency oscillator when the controller is turned off, to provide short bursts of enable power to the controller from the isolated output of the transformer. In this manner, low voltage power is continuously supplied to the controller from the transformer when the controller is off to enable operation of the controller. When the controller is turned on, the burst logic circuit is disabled and the output of the fundamental frequency oscillator is used to control the power output of the transformer.

The primary side of the power supply includes a current sensing arrangement which detects the presence of the load, and latches the primary side of the power supply to remain on when the load is present so as to enable operation of the power supply.

The components of the power supply function to convert high voltage input power to low voltage output power and to isolate the low voltage secondary side of the power supply from the high voltage primary side of the power supply. The invention thus provides a controllable source of low voltage output power for any type of load capable of operating on low voltage electrical power, including but not limited to use with an electric blanket, heating pad or the like.

The invention contemplates a power supply for use in any type of application, as well as a method of generating low voltage output power and an electric blanket having a low voltage power supply, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
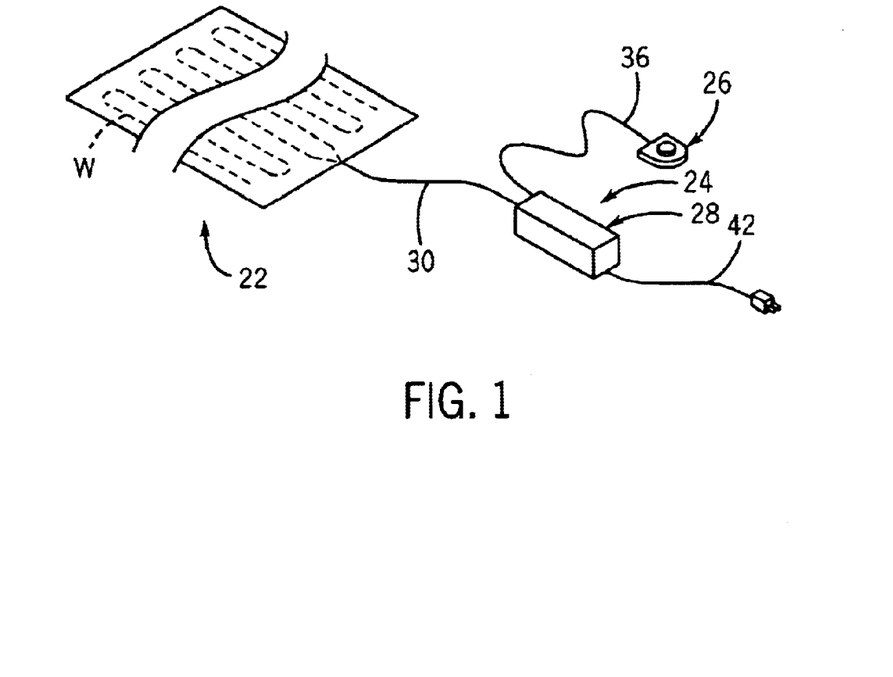
FIG. 1 is an isometric view showing the components incorporated in a representative electrical device, such as an electric blanket, heating pad or throw, which includes the low voltage power supply of the present invention.
Figure 2:
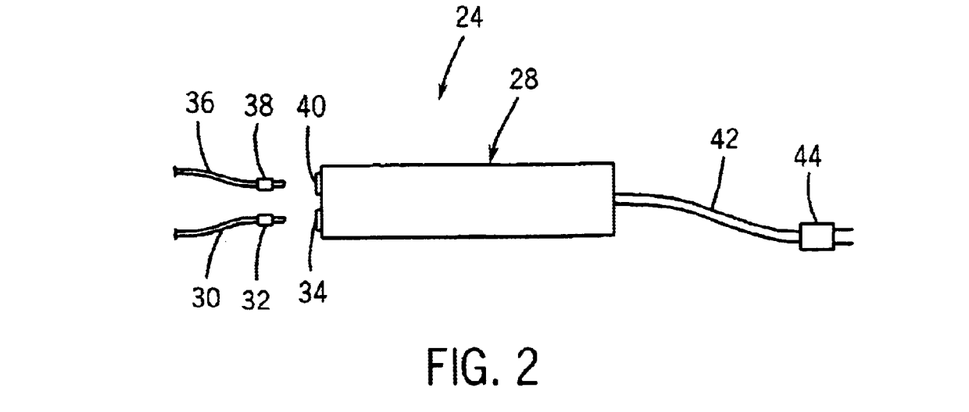
FIG. 2 is a partial top plan view showing the housing for the power supply of FIG. 1.

Referring to FIG. 1, an electrical device, illustrated as an electric blanket, heating pad or throw shown generally at 20, consists of an electrical load in the form of a blanket portion 22 having a heating wire W, a power supply 24 and a controller 26. Power supply 24 includes a housing 28 within which the components of power supply 24 are contained. A connection cable 30 extends from blanket portion 22, and includes a connector 32 at its opposite end that is adapted for selective connection to a power output receptacle 34 incorporated in power supply 24. Similarly, controller 26 includes a connection cable 36 having a connector 38 at its opposite end adapted for selective engagement with a controller receptacle 40 incorporated in power supply 24. A power input cord 42 extends from power supply 24, and includes a plug 44 at its end for engagement with a wall outlet or the like, to supply conventional 110 VAC 60 Hz power to power supply 24. In a manner to be explained, power supply 24 converts the 110 VAC input power from power supply cord 42 into low voltage output power that is supplied to blanket portion 22 as well as to controller 26, for controlling the operation of power supply 24 to control the output of power to blanket portion 22.

Figure 3:
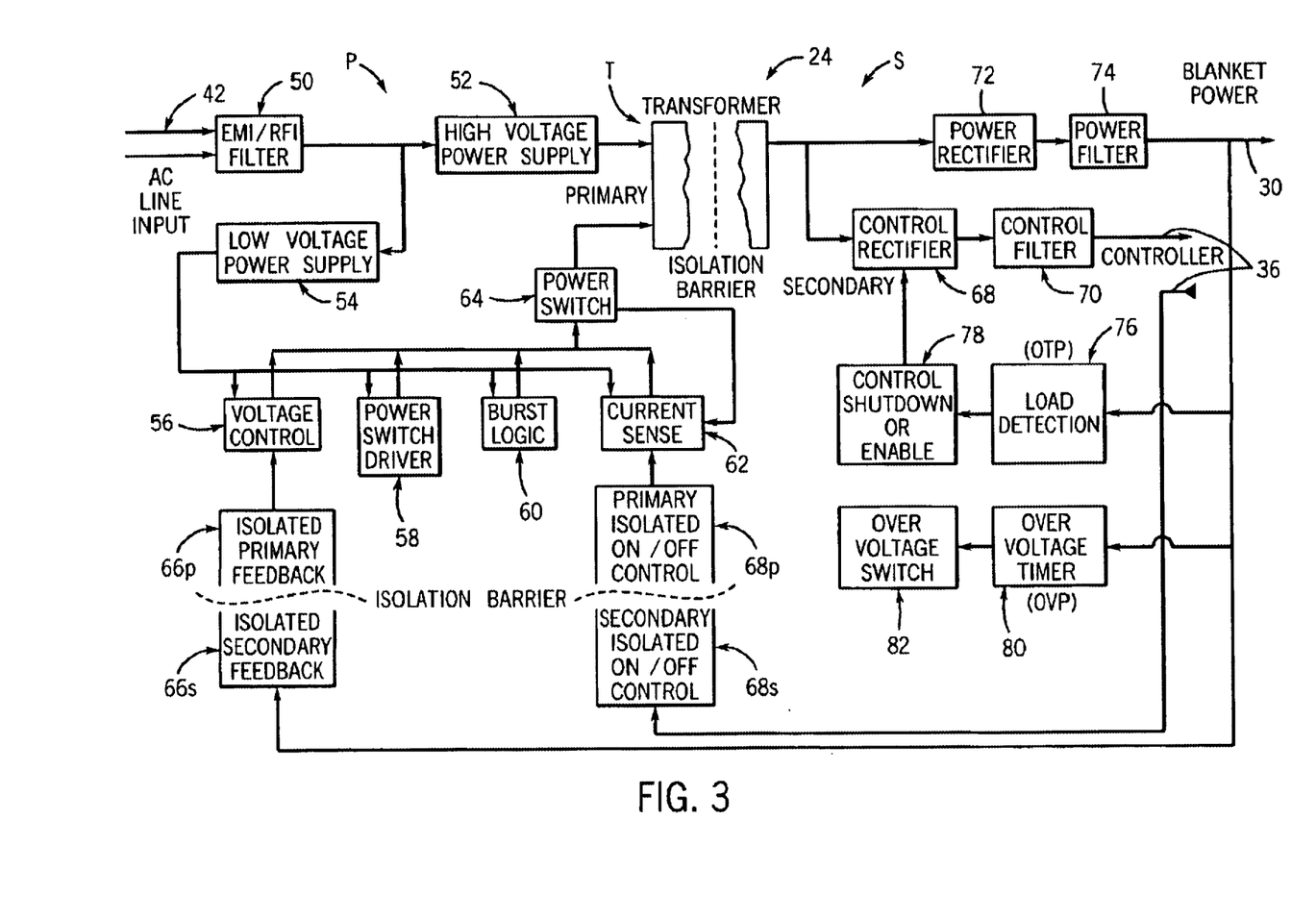
FIG. 3 is a block diagram showing the components incorporated into the power supply of FIG. 1.

FIG. 3 illustrates in block form the components incorporated in power supply 24. Generally, power supply 24 is divided into a high voltage primary side P and a low voltage secondary side S. High voltage power, such as 110 volt AC power, is supplied to the input of primary side P from electrical cord 42 to an EMI/RFI filter 50, which eliminates conducted and emitted radio frequency interference. From EMI/RFI filter 50, high voltage power is supplied to a high voltage power supply 52, which is connected to the primary side of a transformer T.

In a manner as is known, transformer T has a primary winding that is electrically isolated from a secondary winding, to establish an isolation condition such that voltage generated on the secondary winding is not connected to the primary input line voltage.

Primary side P further includes a low voltage power supply 54 which receives high voltage power from EMI/RFI filter 50, and which is interconnected with the remaining components of primary side P which function to provide selective operation of transformer T to generate low voltage output power for supply to secondary side S. Specifically, low voltage power supply 54 is connected to a voltage control circuit 56, a power switch driver circuit 58, a burst logic circuit 60 and a current sensing circuit 62, all of which provide inputs to a power switch circuit 64 which in turn provides an output to current sensing circuit 62. Power switch circuit 64 is interconnected with the high voltage primary side of transformer T, and functions to control operation of transformer T to generate low voltage power in secondary side S. In addition, primary side P includes an isolated primary feedback 66P and an isolated primary on/off control 68P. Secondary side S includes an isolated secondary feedback 66S that is associated with and isolated from primary feedback 66P, and a secondary isolated on/off control 68S that is associated with and isolated from primary isolated on/off control 68P.

The secondary low voltage side of transformer T provides low voltage output power to the isolated secondary side S of power supply 24. Low voltage power is supplied from the output of transformer T to a low voltage control circuit consisting of a control rectifier 68 and a control filter 70, which in turn provides output power to controller 26 through connector 38 and cable 36. Low voltage power from the output of transformer T is also supplied through a power rectifier 72 and a power filter 74 to blanket portion 22 through blanket portion cable 30 and its associated connector 32.

Low voltage power from power filter 74 is supplied to isolated secondary feedback 66S. Inputs from controller 26 are supplied to secondary isolated on/off control 68S. In addition, secondary side S includes a load detection circuit 76, which in turn is connected to a control shutdown/enable circuit 78 that in turn is interconnected with control rectifier 68. Low voltage output power is also supplied from power filter 74 to an over-voltage timer circuit, which is interconnected with an over-voltage switch circuit 82.

Generally, high voltage power supplied to the high voltage primary side of transformer T is converted by transformer T to low voltage power which is supplied to the secondary side of transformer T, in response to operation of power switch 64. Voltage control circuit 56 acts as a pulse width generating circuit. The feedback control provided by isolated secondary feedback 66S and isolated primary feedback circuit 66P, is operable to provide feedback to modulate the outputs of voltage control circuit 56, which in turn controls the duty cycle of power switch 64 to control the amount of power output to the isolated secondary of transformer T.

Burst logic circuit 60 functions to output a short high level enable logic with a long low logic duty cycle when controller 26 is off. Each short high level enables the power switch 64. The high oscillation override frequency from burst logic circuit 60 functions to store a negligible amount of energy in transformer T, and provides low voltage auxiliary power to controller 26 to enable operation of controller 26 at startup. Controller 26, in turn, provides on/off commands to control the duty cycle of power switch 64.

Current sensing circuit 62 detects the connection of blanket heating cable 30 to the output of transformer T. Current sensing circuit 62 enables a fundamental frequency oscillator of primary side P and disables the higher oscillation frequency output by burst logic circuit 60 when controller 26 is turned on, and latches in an on condition to provide operation of power switch 64 when blanket power wire 30 is plugged in.

Load detection circuit 76 detects when the resistance of blanket portion wires W reach or exceed a predetermined threshold, or when blanket portion 22 is removed by disengagement of cable connector 32 from receptacle 34. When this occurs, load detection circuit 76 shuts down controller 26 to cut off the supply of power to secondary side S as well as heat to blanket wire W. Power cannot be restored until the blanket portion wire W cools and burst logic circuit 60 applies energy to controller 26 as described previously.

Figure 4A:
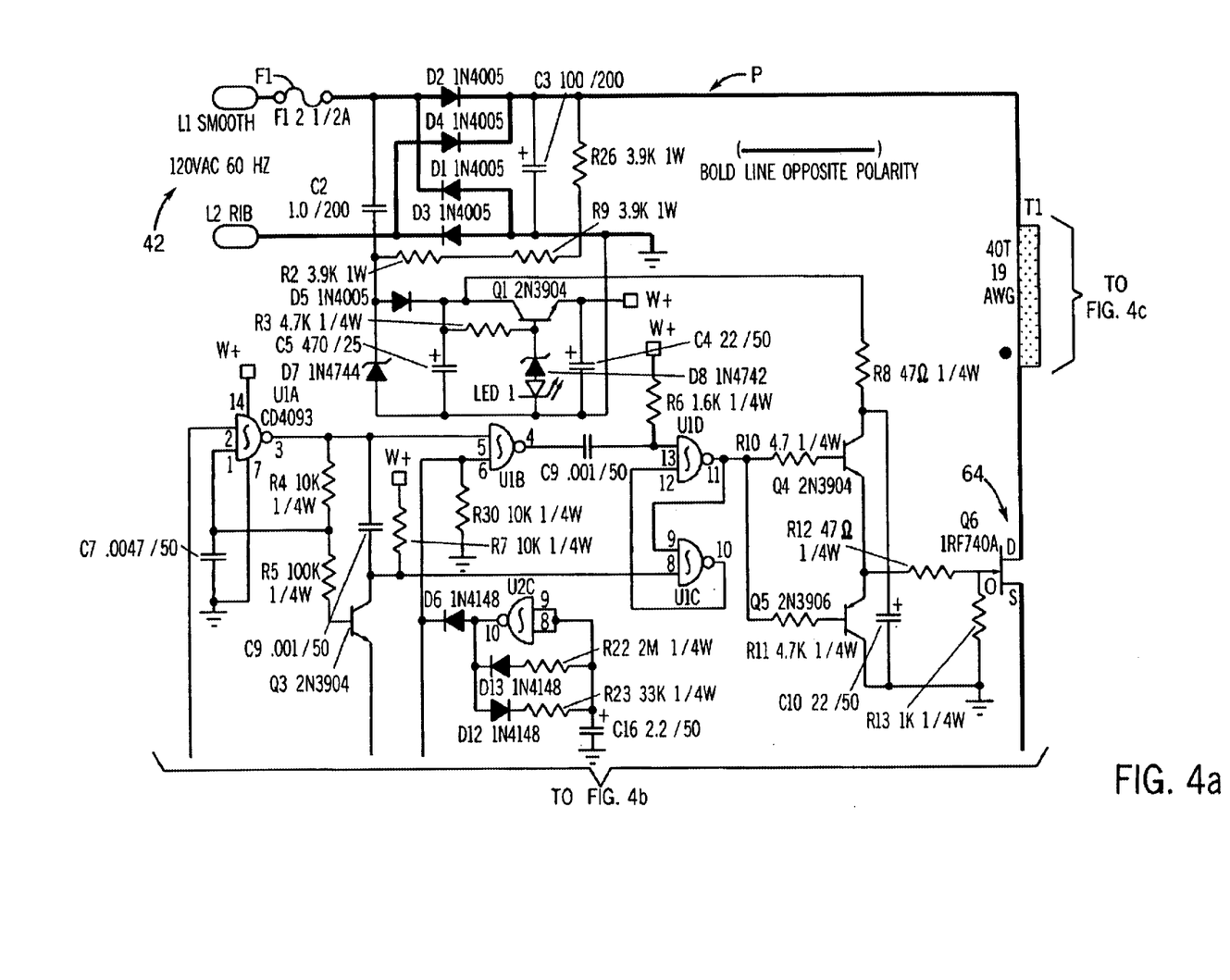
FIG. 4 is a schematic diagram showing the electronic components that comprise the components of the power supply shown in FIG. 3.
Figure 4B:
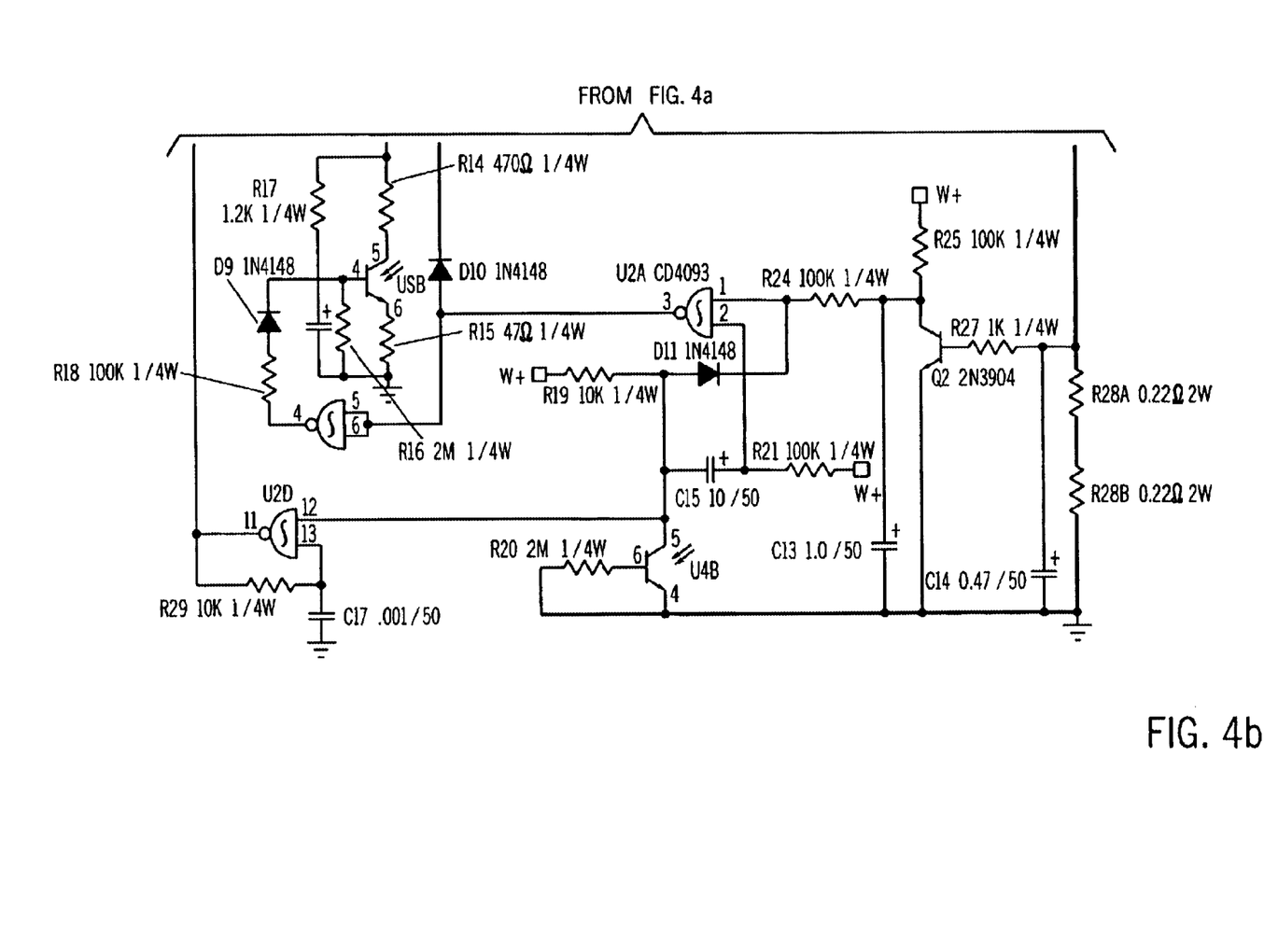
Figure 4C:
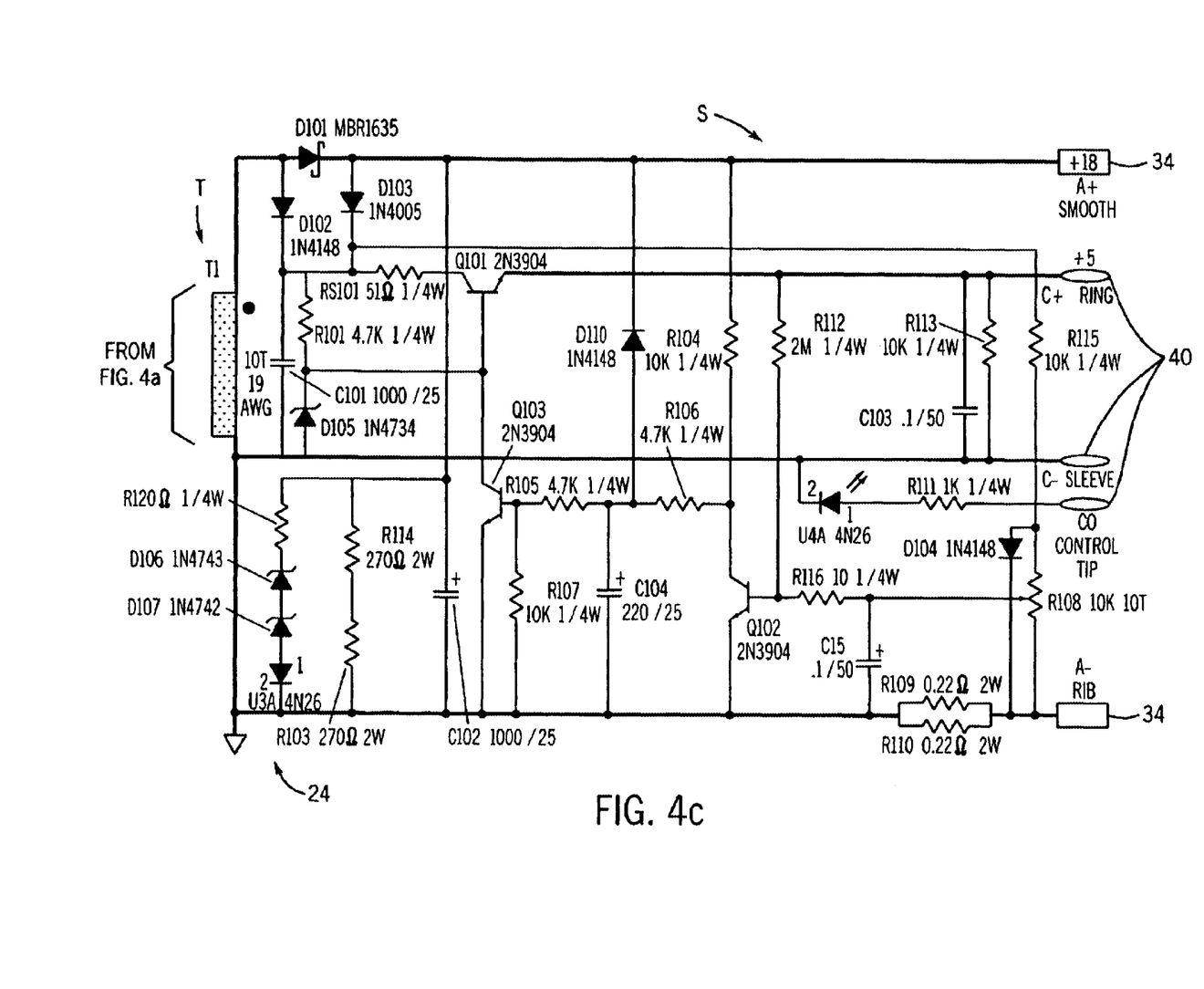

The schematic diagram of FIG. 4 illustrates electronic circuitry that makes up the components of the power supply as shown in FIG. 3. It should be understood that the illustrated and described embodiment is one of any number of ways to carry out the functions of the power supply components illustrated in FIG. 3.

Input high voltage power from cord 42 is supplied to primary side P at L1 and L2. In a manner to be explained, primary side P and transformer T interact to supply low voltage electrical power to secondary side S, such that secondary side S may representatively qualify as a Class 2 (UL) power supply having maximum values of 33 volts and 3 amps.

Low voltage power supply 54 of primary side P supplies power to the remaining components of primary side P at power supply connection W+. Diodes D1, D2, D3 and D4, in combination with capacitor C3 make up a capacitor input full wave power supply in which input voltage is full wave rectified and filtered 120 volt AC. Capacitor C3 is connected to the isolated secondary of transformer T, such that stored voltage on capacitor C3 is used for power conversion to transformer T. The remaining components of low voltage power supply 54, namely resistors R2, R9 and R26, diodes D5, D7, D8 and LED 1, capacitors C4 and C5, resistor R3 and transistor Q1 provide a filtered, clean and stable voltage power source for the circuitry of primary side P. Capacitor C2 provides a current boost to the stable voltage source.

Primary side P includes a fundamental frequency oscillator section incorporated in voltage control circuit 56 that provides a pulsed output at a predetermined frequency. The fundamental frequency oscillator includes a NAND gate U1A in combination with a capacitor C7 and a resistor R4. NAND gate U1A oscillates at a specific "carrier" or fundamental frequency, which may representatively be 30 kHz. The output from NAND gate U1A is supplied to a set-reset flip flop through NAND gate U1B, which acts as an inverter. The set-reset flip flop is a cross coupled flip flop made up of NAND gates U1B and U1C. NAND gates U1A and U1B, which are 180° out of phase, set and reset with a short pulse, to edge trigger NAND gates U1C and U1D, which make up the flip flop. The edge pulse from NAND gate U1A is directed through capacitor C8 to NAND gate U1C, to set the current latch. The output of NAND gate U1D is connected through resistors R10 and R11 to transistors Q4 and Q5.

Without feedback control, the output at NAND gate U1D is approximately a 50-50 duty cycle.

Voltage control circuit 56 is controlled by isolated primary feedback circuit 66P and isolated secondary feedback circuit 66S, which accomplish modulation of the duty cycle of voltage control circuit 56. Isolated primary feedback circuit 66P consists of phototransistor U3B, transistor Q3, and resistors R5, R17, R14, R15 and R16, which cooperate with NAND gate U1C to accomplish modulation of the duty cycle. Capacitor C7, which is part of oscillator the fundamental frequency oscillator, controls the fundamental frequency from NAND gate U1A and also feeds the base of transistor Q3 through resistor R5.

Threshold voltage is set on the emitter of transistor Q3 of primary side P with the feedback from isolated secondary feedback circuit 66S through isolated primary feedback circuit 66P, which include respective associated phototransistors U3A (located on secondary side S) and U3B located on primary side P. As output voltage in secondary side S increases, phototransistor U3B begins to conduct, and to thereby hold the emitter of transistor Q3 to ground. This functions to decrease the reset threshold through capacitor C7 and resistors R4 and R5, and the power pulse is terminated by the collector of transistor Q3 in combination with resistor R7 and NAND gate U1C. As voltage increases on secondary side S, the voltage is fed through two series zener diodes D106 and D107 and through current limiting resistor R102, to set threshold voltage to turn on phototransistor U3A. If voltage on secondary side S exceeds voltage in isolated primary feedback circuit 66P, current runs through the IRED LED of phototransistor U3A to turn on associated phototransistor U3B on primary side P, which reduces the voltage. Voltage in phototransistor U3A is reduced so as to reduce the amount of current, and the zener diode network in the IRED of phototransistor U3A reduces the threshold, such that voltage goes back up. Eventually, an equilibrium is reached and a specific voltage is maintained which, in a manner to be explained, is the voltage that provides the appropriate current and heat in blanket portion 22 according to the setting of controller 26. Resistor R17 and capacitor C11 provide circuit compensation and stability in isolated primary feedback circuit 66P, to provide filtering so that changes in output are filtered and to provide a smooth DC output. Resistor R17 and capacitor C11 make up a high pass filter. Resistor R16 provides a high resistance path for the base of phototransistor U3B to ground. With this arrangement, the association of phototransistors U3A on secondary side S and U3B on primary side S make up a feedback loop which controls the duty cycle of power switch 64.

The output from the set-reset flip flop (pin 11 of NAND gate U1D) is supplied through resistors R10 and R11 and is current buffered by transistors Q4 and Q5 to drive power switch Q6. During the time period that power switch Q6 is on, energy is stored in transformer T, which in the illustrated embodiment is a flyback-type transformer. In this manner, when power switch Q6 is turned off, energy stored in transformer T transfers to secondary side S, in accordance with known operation. While transformer T is illustrated and described as a flyback-type transformer, it is also understood that the transformer could be of any other design that functions to isolate and supply energy to secondary side S, such as a buck boost design or a push-pull design.

Power from secondary side S is supplied to heating wire W of blanket portion 22 from output terminals A+ and A−, which are associated with power output receptacle 34 for engagement by connector 38. Controller 26 is connected to secondary side S at terminals C+, C− and C0, which are associated with controller receptacle 40 for engagement by connector 38.

In order to initiate operation of the power supply in response to an on signal received from controller 26, which is connected to secondary side S, it is necessary to transfer power from primary side P to secondary side S in order to turn on power supply 24. To accomplish this, primary side P includes burst logic circuit 60 that includes a short pulse network and a high frequency override oscillator network. Together, the short pulse network and override oscillator network, which runs at approximately 4 to 5 times the fundamental frequency, make up a timed burst and limited power oscillator. Pin 10 of NAND gate U2C is a short high level enable logic with a long low logic duty cycle. Each short high level enables drive circuit U1C, U1D. The high speed oscillation of the override oscillator network overrides the lower fundamental frequency of the fundamental frequency oscillator (U1A). The high oscillation override frequency limits the amount of energy stored in transformer T upon operation of the short pulse network and override oscillator network. Because of the association between NAND gates U2C and U2D, the enablement of the drive circuit (U1C, U1D) by the short pulse network allows the high frequency of the override oscillator network to operate power switch Q6 on and off at a very high frequency for a short period of time, to provide equalized pulses or bursts of energy through transformer T to control rectifier 68, which supplies power to terminal C+, and thereby to controller 26. The auxiliary power supply network consists of diodes D101, D102, D103 and D105, resistors R101 and RS101 and transistor Q101, which together provide 5 volt auxiliary power to controller 26. The burst energy functions to charge capacitor C101, which has a 5 volt output that is supplied through control connection C+ to controller 26 and which is returned from controller 26 through connection C0 to turn on secondary side S by applying the 5 volt power through resistor R111 and phototransistor U4A, which is associated with phototransistor U4B on primary side P. In this manner, when phototransistor U4A LED is forward biased, phototransistor U4B is turned on so as to pull the collector of phototransistor U4B to ground. This functions to disable the high frequency override oscillator network by grounding pin 12 of NAND gate U2D. Simultaneously, pin 3 of NAND gate U2A goes high, which again enables inverter NAND gate U1B, to turn on the PWM network of voltage control 56 and isolated primary feedback circuit 66P, to provide regulation of the duty cycle of power switch 64 and thereby the energy output by transformer T and supplied to blanket portion 22 through connections A+ and A−.

Current sensing circuit 62, which consists of resistors R25, R27, R28A and R28B in combination with capacitors C13 and C14 and transistor Q2 on primary side P, function to ensure the supply of power to blanket portion connections A+ and A− as long as blanket portion 22 remains connected. The connection of blanket portion 22 to output connections A+ and A− functions to draw current out of transformer T, and resistors R28A and R28B function to sense the energy in current through power switch Q6. During normal operation, transistor Q2 conducts and NAND gate U2A goes high, which enables the fundamental frequency oscillator (U1A). Phototransistor U4B on primary side P, which is associated with phototransistor U4A on secondary side S, detects the presence of an on signal from controller 26, to enable phototransistor U4B to conduct. Pin 12 of NAND gate U2D provides an output logic high at pin 1, so as to enable the fundamental frequency oscillator (U1A) and to disable the high frequency override oscillator network. Simultaneously, pin 2 of NAND gate U2A is pulled low, to enable the output pin 11 of NAND gate U1D. At the time of the initial on signal at phototransistor U4B, if blanket portion 22 is attached, the collector of phototransistor U4B goes to a logic low through the current of resistors R28A and R28B, such that current sensing network 48 is latched to remain on.

In the event blanket portion 22 is disconnected from power supply housing 24, the circuit of secondary side S is opened which results in transistor Q2 on primary side P immediately turning off due to the preset voltage drop across resistors R28A and R28B. Capacitor C13 functions to provide a slight delay to accommodate a temporary line bump open circuit condition. Upon disconnection of blanket portion 22, the input at pin 1 of NAND gate U2A goes high. Pin 2 of NAND gate U2A is high due to the charge from capacitor C15, which results in the output of NAND gate U2A going low. When this occurs, the fundamental frequency oscillator (U1A) is disabled, which shuts down primary side P and thereby secondary side S, to cut off the supply of power. In addition, this feature requires the connection of blanket portion 22 to secondary side S before the power supply system can be operated.

Controller 26 provides the on/off commands that are interpreted by phototransistor U4B on primary side P via the associated phototransistor U4A on secondary side S, in combination with resistor R111, which in turn controls the duty cycle of power switch Q6, as discussed previously. The commands from the controller are logic high and low duty cycle. High duty cycle logic commands increase the ratio of on to off of power switch Q6, to increase blanket temperature. Lower duty cycle commands decrease the blanket temperature by decreasing the ratio of on to off of power switch Q6. Phototransistor U4A operates in response to inputs from controller 26 through terminal C0 to feed back to the PWM control of primary side P in a variable duty cycle, to turn power supply 24 on and to verify that blanket portion 22 is connected. Current sensing circuit 62 is operable to latch power switch Q6 on, and at the same time is operable to verify that wire W of blanket portion 22 is not in an over-temperature condition. Phototransistor U4A then functions in response to the inputs from controller 26 to interact with phototransistor U4B to turn power switch Q6 on and off according to the desired duty cycle.

During the time that secondary side S is on, as controlled by controller 26 and phototransistor U4A, electrical power is output to blanket portion 22 through connectors A+ and A−. Energy output to connectors A+ and A− is filtered and stored by capacitor C102. Voltage output applied to connectors A+ and A− is limited and regulated by diodes D106 and D107 in combination with phototransistor U3A and pre-load resistors R103 and R114, which make up isolated secondary feedback circuit 66S. As voltage across isolated secondary feedback network 66S increases, phototransistor U3A on primary side P conducts due to its association with phototransistor U3A on secondary side S, which lowers the voltage output of secondary side S. Conversely, as voltage in isolated secondary feedback network decreases, phototransistor U3B on primary side P lacks conduction, which raises the voltage output of secondary side S until equilibrium is reached. A compensation network, consisting of resistor R17 and capacitor C11 on primary side P, function to provide equilibrium stability.

Figure 5:
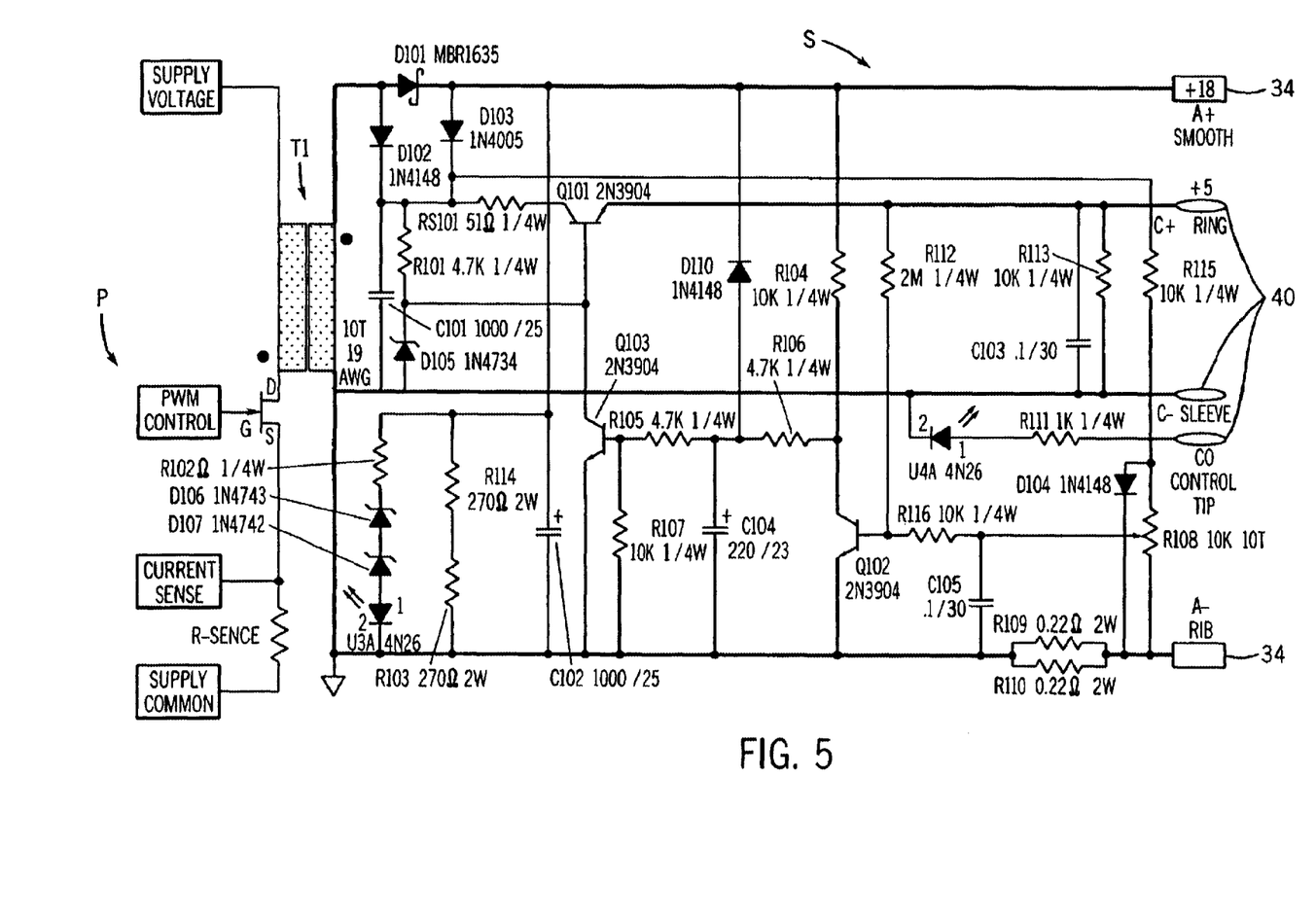
FIG. 5 is a schematic diagram showing the secondary side of the power supply of FIG. 4, to illustrate an over-temperature and load check connection feature incorporated into the power supply.

Referring to FIG. 5, secondary side S includes an over-temperature detection circuit which functions to control operation of transistor Q101. The heating wire W of blanket portion 22 has a positive temperature coefficient (PTC), such that the resistance of heating wire W increases and current in heating wire W is reduced, in proportion to an increase in the endothermic temperature change of heating wire W. Representatively, heating wire W may be formed of a material such as copper having a gauge selected to provide the desired positive temperature coefficient according to the length of heating wire W incorporated in blanket portion 22. Current to wire W is sensed through parallel resistors R109 and R110. A voltage drop across resistors R109 and R110 is fed to transistor Q102 through a resistor R116 via capacitor C105. Because connectors A+ and A− apply a stable voltage to wire W, as wire W heats endothermically, resistance increases and the current decreases, resulting in a decrease in the voltage drop across resistors R109 and R110. Resistor R115 and diode D104 make up a voltage reference, in which adjustable resistor R108 across the voltage reference. The adjustment voltage of resistor R108, added to the voltage drop across parallel resistors R109 and R110, maintains transistor Q102 on if the current is high and the resistance of wire W is low, meaning that the temperature of blanket portion 22 is within predetermined limits. As the temperature of blanket portion 22 rises due to endothermic heating of wire W, the resistance of wire W increases which results in a decrease in current of wire W, causing a decrease in the voltage drop across resistors R109 and R110. When the resistance of wire W reaches a predetermined threshold, the voltage drop across resistors R109 and R110 results in transistor Q102 turning off, which turns transistor Q103 on through resistor network R104, R105 and R106. When transistor Q103 is in an on condition, transistor Q101 is turned to an off condition which removes power or logic from controller 26 through control terminal C+. Such removal of logic from control terminal C+ disables the signal used to maintain the supply of power to blanket heating wire W, as described previously. Power supply 24 is thus shut down. Power to blanket portion 22 cannot be restored until wire W cools and a signal is sent to phototransistor U4A and resistor R111 through control input C0.

Capacitor C104 functions as a power on delay which allows transistor Q103 to remain off while transistor Q101 remains on. This momentary delay allows power to be applied to blanket heating wire W for a check of the current and therefore the endothermic temperature of heating wire W.

Resistor R112 is a positive feedback network to provide circuit snap action. Diode D110 discharges capacitor C104 at the moment power applied to blanket heating wire W is cut off, which provides a reset of the heating wire current check system.

It should be understood that the over-temperature protection circuit incorporated in secondary side S may be used in connection with any type of power supply, and is not limited to use in a power supply having the specific construction and operation as shown and described. Further, while the over-temperature detection circuit makes use of positive temperature characteristics of wire W, it is understood that reverse logic can be used if wire W is selected to have negative temperature coefficient characteristics.

It can thus be appreciated that the above-described over-temperature protection circuit also functions to shut down controller 26 and thereby power supply 24 in the event blanket portion 22 is removed from its connection to power supply 24. When blanket portion 22 is removed, the resistance experienced by secondary side S immediately becomes infinite, which has the same effect as an increase in the resistance of blanket heating wire W above the predetermined threshold, to trigger operation of the over-temperature detection circuit to cut off the supply of power to controller 26. As noted previously, the cut off of supply to controller 26 shuts down power supply 24, which can subsequently be restarted by reconnecting blanket portion 22 and initiating operation of the power supply via controller 26 as discussed above.

When power to the microprocessor of controller 26 is cut off in this manner, the controller microprocessor does not automatically turn itself back on when the 5 volt auxiliary power to controller 26 is restored because the microprocessor has been turned off. In order to restart, the power button of controller 26 must be actuated in order to restore operation of power supply 24.

In the event of an over-temperature condition or a condition in which blanket portion 22 is disengaged from the controller, capacitor C104 on secondary side S discharges through diode D110, to provide a power-up reset and a 5 volt pulse controller 26 through transistor Q103. The 5 volt pulse functions to both check the balance of controller 26 and to provide a power-up reset. In this manner, when the power supply cycles on and off with the control it is also charging capacitor C104 so that each new cycle is unique, and also provides continuous reset of the over-temperature protection circuit.

Resistor R112 is a positive feedback that provides snap action when the threshold is reached. Capacitor C103 and resistor R113 provide a filter network for the common and +5 volt connections C+ and C−, respectively. Capacitor C102 is a high energy capacitor that feeds the load of blanket portion 22 by being charged on flyback from transformer diode D101, which is a high speed current diode that rectifies the output of transformer T.

Figure 6:
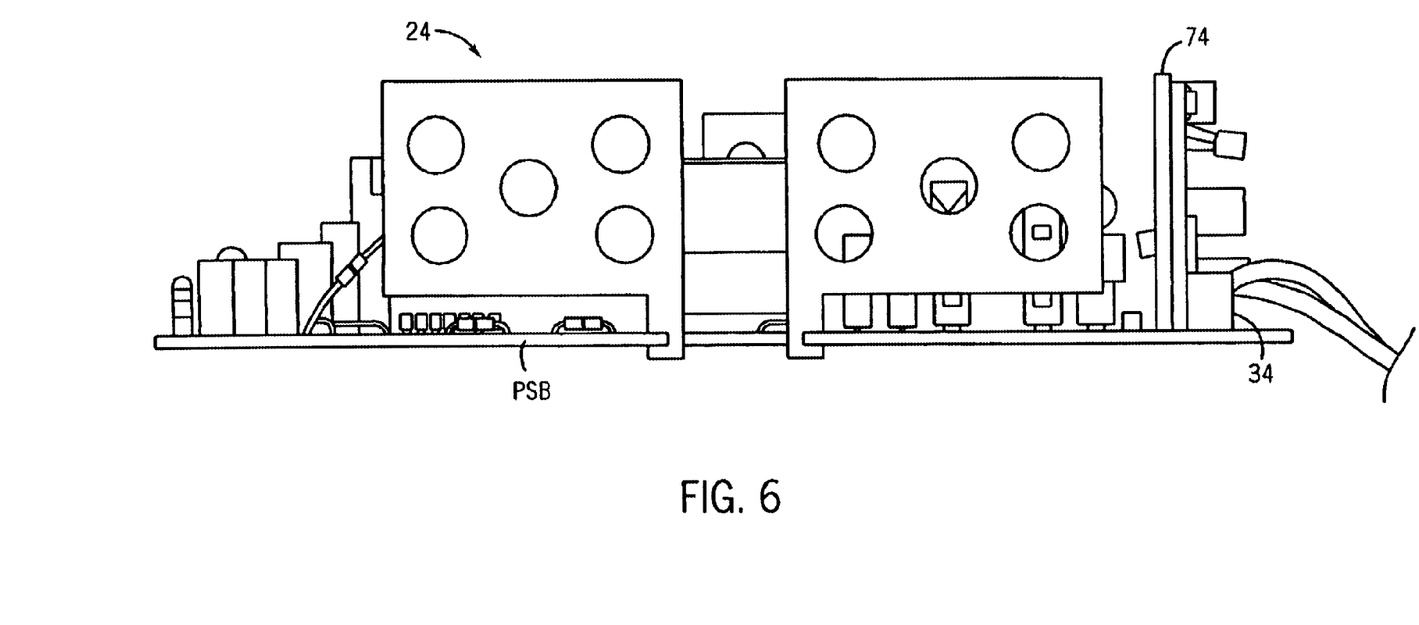
FIGS. 6 and 7 is are views showing a circuit board for mounting the electronic components of the power supply as shown in FIG. 4, and including an over-voltage protection circuit for use therewith.

The invention also contemplates an over-voltage protection arrangement, which is plugged into the circuit board that contains the electronic components of power supply 24 as shown in FIG. 4. The over-voltage protection feature consists of an over-voltage protection board 74 which ensures that power output to blanket portion 22 through terminals A+ and A− does not exceed a low voltage power supply threshold, e.g. 33 volts. FIGS. 5 and 6 show over-voltage protection circuit board 74 plugged into the power supply circuit board, shown at PSB. Preferably, over-voltage protection circuit board 74 is inserted in a slot or other interruption in the circuitry that supplies output power to power output receptacle 34, to prevent the supply of power to power output receptacle 34 in the event that over-voltage protection circuit board 74 is not installed in the slot in power supply board PSB.

Figure 7:
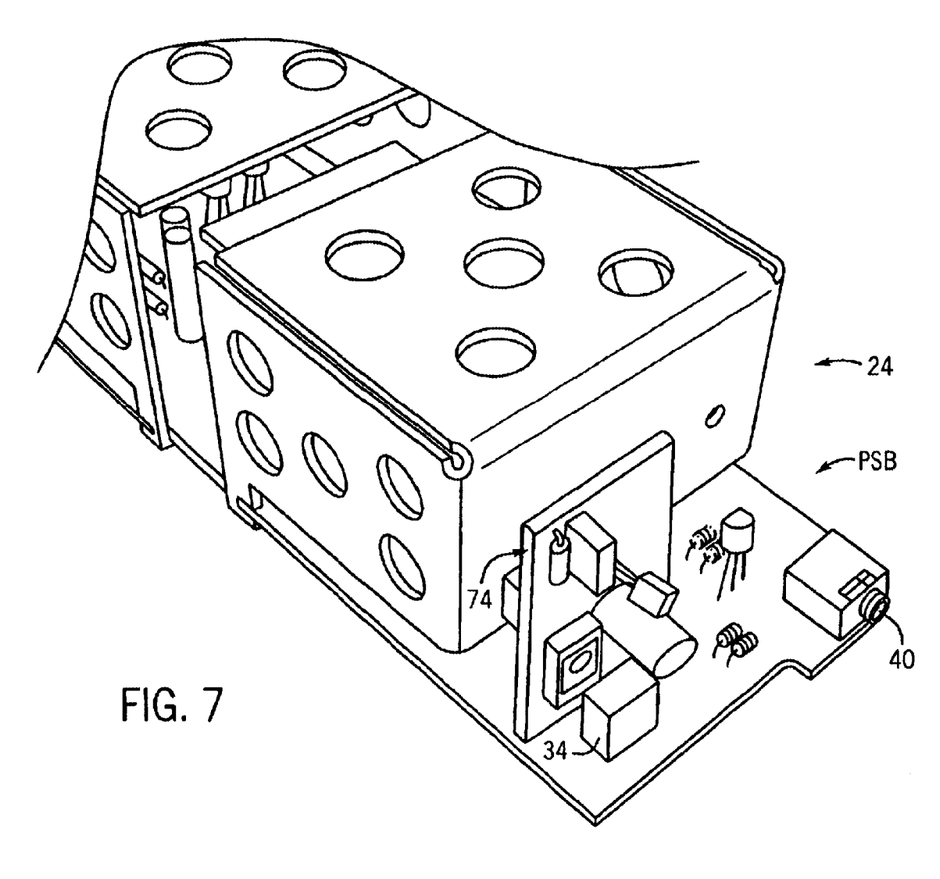
Figure 8:
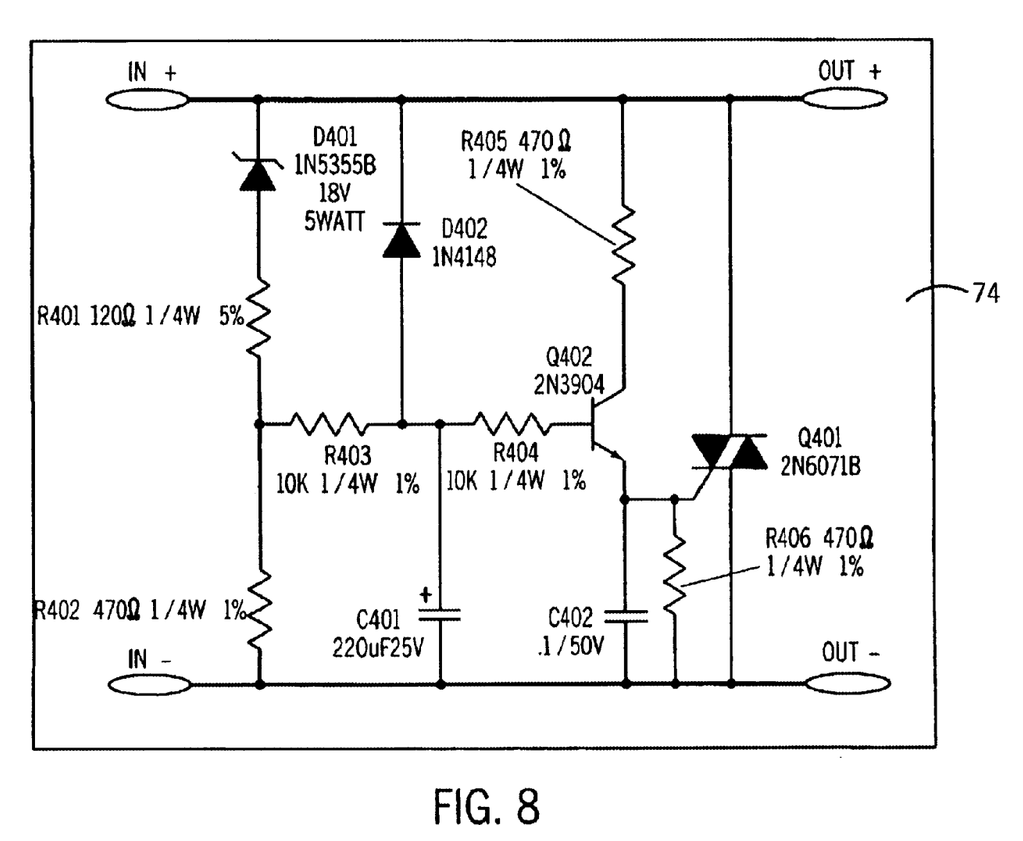
FIG. 8 is a schematic diagram showing the components of the over-voltage protection circuit incorporated into the components of the power supply as shown in FIGS. 6 and 7.

FIG. 7 shows the circuitry of the over-voltage protection circuit incorporated in over-voltage protection circuit board 74. Voltage is applied across connections IN+ and IN−. A zener diode D401 functions to subtract a predetermined voltage, e.g. 18 volts, from the IN+ connector and the balance is divided between resistors R401 and R402. If the voltage at the junction of resistors R401, R402 and R403 is at or below a predetermined threshold, then transistor Q402 conducts. Transistor Q401 is a triac that functions as a current amplifier. As the voltage at the junction of resistors R401, R402 and R403 increases, such voltage is applied to the gate of triac Q401. In the event voltage exceeds a predetermined threshold set by triac Q401, triac Q401 conducts and becomes a direct short between IN+ and IN−, to provide a dead short. This functions to immediately result in a current in primary side P that exceeds the rating of fuse F1 (FIG. 4), which blows fuse F1 so as to cut off the supply of input power to power supply 24.

In the event over-voltage protection circuit board 74 is assembled improperly, e.g. inserted backward within the slot in power supply circuit board PSB, transistor Q402 acts as a zener diode and immediately fires triac Q401 to provide a short between IN+ and IN−.

Resistor R403 and capacitor C401 provide a time delay, e.g. on the order of 0.5 to 1 seconds, in the event of a quick spike of over-voltage in the power supply circuit, due to the time that it takes capacitor C401 to charge. In any such voltage spike situation, capacitor C401 discharges to zero through transistor Q402 into blanket heating wire W. Capacitor C402 and resistor R405 provide a filter network to prevent false triggering, to prevent exposure of triac Q401 to fast pulses.

While the various aspects of the power supply of the present invention are shown in combination, it is understood that certain aspects may be used independently of others or in various subcombinations, and in various applications. Further, while power supply 24 is shown and described in connection with an electric blanket, heating pad or throw, it should be understood that the power supply of the present invention may be used in any application in which it is desired to output controlled low voltage output power from a high voltage power input.

Various alternatives and embodiments are contemplated as being within the scope of the following claims particularly pointing out and distinctly claiming the subject matter regarded as the invention.

I claim:

1. An electrically powered device, comprising:
   a pliable heating member having a resistive heating element; and
   a power supply for supplying power to the resistive heating element of the pliable heating member, comprising:
     a power input arrangement adapted to receive input power having a high voltage exceeding a predetermined low voltage threshold;
     an isolation-type power conversion device including an input and an isolated output, wherein the input is interconnected with the power input arrangement;
     a switching arrangement interconnected with the power conversion device, wherein the switching arrangement is configured and arranged to provide continuous intermittent operation of the power conversion device; and
     a low voltage power output arrangement interconnected with the isolated output of the power conversion device, wherein the low voltage power output arrangement is interconnected with the resistive heating element of the pliable heating member;
     wherein the intermittent operation of the power conversion device by the switching arrangement is operable to supply continuous low voltage output power having a voltage below the low voltage threshold to the resistive heating element of the pliable heating member through the isolated output of the power conversion device and the low voltage power output arrangement.

2. The electrically powered device of claim 1, further comprising a controller for controlling operation of the switching arrangement to vary the low voltage power output of the power conversion device, wherein the controller is configured and arranged to control operation of the switching arrangement without interruption in the continuous supply of low voltage power to the resistive heating element from the power output arrangement.

3. The electrically powered device of claim 2, wherein the controller is interconnected with the power output arrangement so that the controller is powered by low voltage output power having a voltage below the low voltage threshold from the isolated output of the power conversion device.

4. The electrically powered device of claim 3, wherein the controller comprises a pulse width modulation control that provides variable duty cycle operation of the switching arrangement and thereby the low voltage power output of the power conversion device.

5. The electrically powered device of claim 4, wherein the pulse width modulation control includes a secondary isolated feedback circuit interconnected with the controller and a primary isolated feedback circuit interconnected with the switching arrangement, wherein the primary and secondary feedback circuits are isolated from each other and interact to control operation of the switching arrangement to vary the period of intermittent operation of the power conversion device and thereby the low voltage power output of the power conversion device.

6. The electrically powered device of claim 5, wherein the pulse width modulation control operates at a first frequency, and further comprising an override circuit that operates at a second frequency higher than the first frequency, wherein the override circuit interacts with the switching arrangement to operate the power conversion device so as to supply low voltage power to the controller when the controller is off, and wherein turning the controller on is operable to disable the override circuit and to initiate operation of the pulse width modulation control.

7. The electrically powered device of claim 3, wherein the power supply includes a primary side that receives high voltage power from the power input arrangement and which includes the switching arrangement, and a secondary side isolated from the primary side via the isolation-type power conversion device, wherein the secondary side further includes the low voltage power output arrangement and the controller, wherein the low voltage power output arrangement is interconnected with the resistive heating element via a removable connection of the resistive heating element to the low voltage power output arrangement, and further comprising a load detection circuit interconnected with the low voltage power output arrangement for enabling operation of the controller when the resistive heating element is connected and for disabling the controller when the resistive heating element is disconnected.

8. The electrically powered device of claim 1, further comprising a switch interconnected with the low voltage power output arrangement and configured to disable the power supply in the event the voltage of the low voltage power output arrangement exceeds the low voltage threshold.

9. An electrically operated heating arrangement, comprising:
   a pliable heating member having a resistive load in the form of a resistive heating element;
   a power supply to which the resistive heating element is connected, wherein the power supply includes a high voltage power input adapted to be supplied with power exceeding a predetermined low voltage threshold, a power conversion arrangement, and a low voltage power output that is supplied with power below the low voltage threshold from the power conversion arrangement, wherein the resistive heating element is connected to the low voltage power output and wherein the supply of low voltage power to the resistive heating element is operable to generate heat from the resistive heating element; and a controller interconnected with the power supply to vary the low voltage power output and to thereby control the heat generated by the resistive heating element, wherein the controller is configured and arranged to control operation of the switching arrangement without interruption in the supply of low voltage power to the resistive heating element from the low voltage power output.

10. The heating arrangement of claim 9, wherein the power conversion arrangement includes a primary side supplied with power exceeding the low voltage threshold and an isolated secondary side that outputs power below the low voltage threshold.

11. The electrically operated heating arrangement of claim 10, wherein the controller is interconnected with and supplied with low voltage power from the isolated secondary side of the power conversion arrangement.

12. The electrically operated heating arrangement of claim 11, wherein the resistive heating element is interconnected with the low voltage power output via a removable connection arrangement, and further comprising a load detection circuit interconnected with the controller for enabling operation of the controller when the resistive heating element is connected to the low voltage power output and for disabling operation of the controller when the resistive heating element is disconnected from the low voltage power output.

13. The electrically operated heating arrangement of claim 10, further comprising a voltage detector interconnected with the secondary side of the power conversion arrangement, wherein the voltage detector is operable to discontinue operation of the power supply in the event the voltage of power to the secondary side of the power conversion arrangement exceeds the low voltage threshold.

14. The electrically operated heating arrangement of claim 13, wherein the voltage detector includes a timing arrangement that discontinues operation of the power supply when the voltage exceeds the predetermined threshold for a predetermined time period.

15. The electrically operated heating arrangement of claim 10, wherein the controller is interconnected with the secondary side of the power conversion arrangement, and further comprising a switching circuit interconnected with the primary side of the power conversion arrangement, wherein the switching circuit provides intermittent operation of the power conversion arrangement.

16. The electrically operated heating arrangement of claim 15, wherein the controller is electrically isolated from the switching circuit and is operable to control the switching circuit to vary the period of intermittent operation of the power conversion arrangement so as to vary the power output of the power conversion arrangement.

17. The electrically operated heating arrangement of claim 16, wherein the switching circuit comprises a pulse width modulation circuit and wherein the controller is operable to vary the duty cycle of the pulse width modulation circuit.

18. The electrically operated heating arrangement of claim 17, further comprising an override circuit that interacts with the switching circuit when the controller is off so as to supply low voltage power to the controller from the power conversion arrangement, wherein turning the controller on disables the override circuit.

19. A method of supplying low voltage output power to a resistive heating element of a pliable member from a high voltage power source, comprising the steps of:
supplying high voltage power from the high voltage power source to a high voltage power input associated with a power conversion device having a low voltage power output electrically isolated from the high voltage power input;
providing intermittent operation of the power conversion device to supply power to the low voltage output of the power conversion device;
supplying low voltage power from the low voltage power output of the power conversion device to the resistive heating element of the pliable member; and
controlling the intermittent operation of the power conversion device to vary the power supplied by the power conversion device to the low voltage output of the power conversion device, wherein the step of controlling intermittent operation of the power conversion device is carried out without disrupting the supply of low voltage power from the low voltage power output of the power conversion device.

20. The method of claim 19, wherein the step of providing intermittent operation of the power conversion device is carried out by operation of a power switch.

21. The method of claim 20, wherein the power switch is operated via a pulse width modulation arrangement, wherein the pulse width modulation arrangement is responsive to a controller which carries out the step of controlling the intermittent operation of the power conversion device through the pulse width modulation arrangement.

22. The method of claim 21, further comprising the step of supplying low voltage power to the controller from the low voltage output of the power conversion device.

23. The method of claim 22, further comprising the step of detecting the presence of the resistive heating element, and enabling operation of the controller in response to the presence of the resistive heating element and disabling the controller in response to the absence of the resistive heating element.

24. The method of claim 22, further comprising the step of providing low voltage power to the controller through the power conversion device to provide initial operation of the controller when the controller is placed in an on condition from an off condition.

25. The method of claim 24, wherein the pulse width modulation arrangement provides modulation of the power switch at a first frequency, and wherein the step of providing low voltage power to the controller is carried out by providing intermittent operation of the power switch at a second frequency, higher than the first frequency, to operate the power conversion device and to supply low voltage power to the controller.

26. The method of claim 20, further comprising the step of sensing current between the power switch and the power conversion device and enabling operation of the power switch in response thereto.

27. The method of claim 19, further comprising the steps of detecting the voltage of power supplied to the resistive heating element from the low voltage output of the power conversion device, and discontinuing the supply of power to the low voltage output of the power conversion device in response to detection of power to the resistive heating element exceeding a predetermined voltage threshold.

28. The method of claim 27, further comprising the step of delaying the discontinuance of the supply of power to the low voltage output for a predetermined time period so as to temporarily maintain the supply of power to the low voltage power output having a voltage exceeding the low voltage threshold.

* * * * *